(No Model.) 2 Sheets—Sheet 2.
C. L. FORTIER.
VELOCIPEDE.
No. 451,035. Patented Apr. 28, 1891.
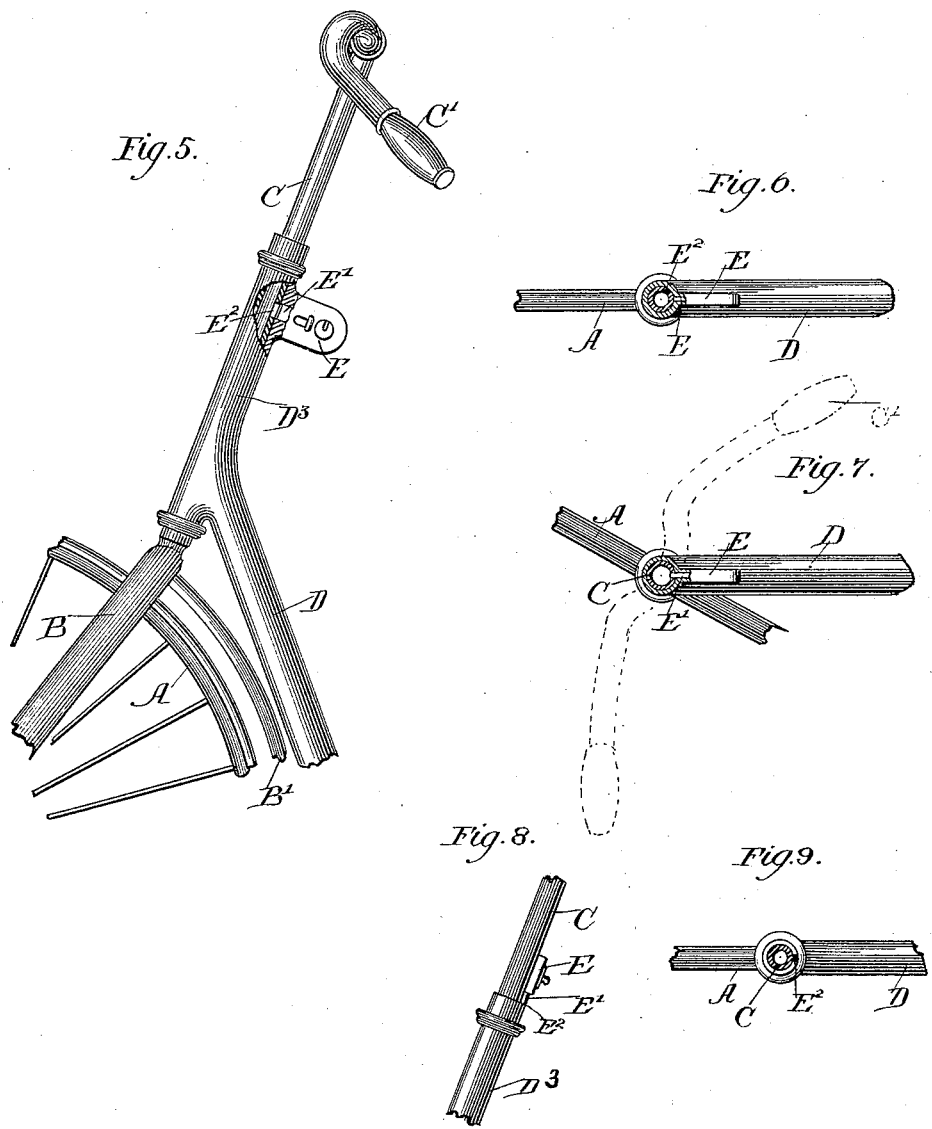

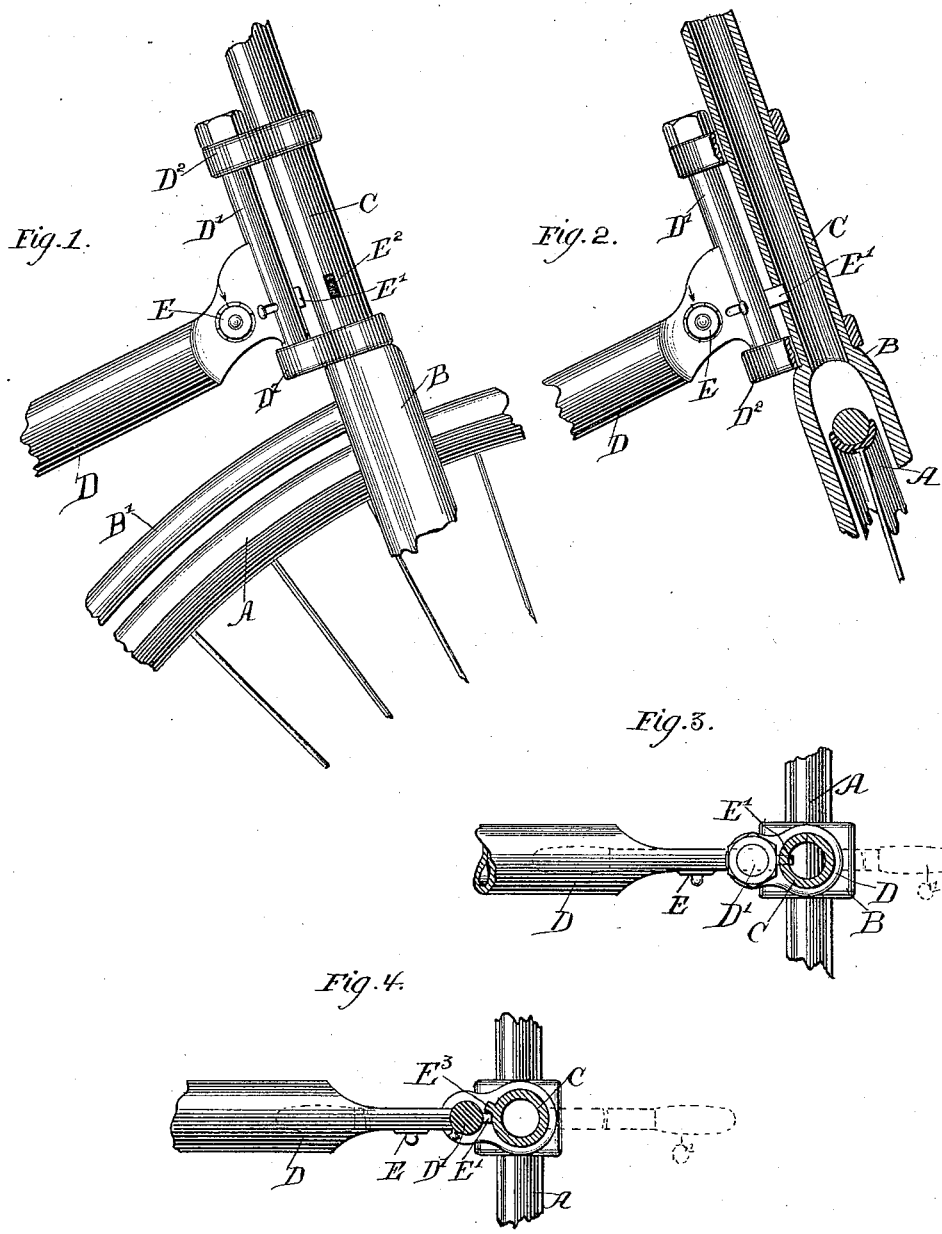

UNITED STATES PATENT OFFICE.

CHARLES LYMAN FORTIER, OF MILWAUKEE, WISCONSIN.

VELOCIPEDE.

SPECIFICATION forming part of Letters Patent No. 451,035, dated April 28, 1891.

Application filed January 9, 1890. Serial No. 336,442. (No model.)

*To all whom it may concern:*

Be it known that I, CHARLES LYMAN FORTIER, a citizen of the United States, residing at Milwaukee, in the county of Milwaukee and State of Wisconsin, have invented certain new and useful Improvements in Velocipedes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My improvement relates particularly to the application of a lock permanently at the junction of the backbone and the steering-shaft of the machine for the purpose of rendering the steering-shaft inoperative and holding the wheel cramped when the bolt of the lock is set in the operative position. The purpose is to avoid the use of the machine by unauthorized persons.

Locks have heretofore been applied to velocipedes in such position as to engage either the hub or the axle of the wheel and prevent the rotation of the latter.

In the accompanying drawings, Figure 1 shows such a lock applied to a machine in which the backbone is "hung" on the steering-shaft. Fig. 2 is a sectional view of the same parts, the lock being set. Fig. 3 is a horizontal sectional view of the parts shown in Fig. 2. Fig. 4 is a horizontal sectional view of a modification of the form shown in the preceding figures. Fig. 5 is a portion of one of the so-called "Safety" bicycles having a lock applied thereto. Figs. 6 and 7 are horizontal sectional views of the apparatus shown in Fig. 5. Figs. 8 and 9 show a modification of the apparatus shown in Figs. 5, 6, and 7.

Referring first to the drawings on Sheet 1, A is the wheel of the machine. B is the fork. B' is the guard. C is the ordinary cylindric steering-shaft rising from and rigid with the fork B and supporting at its upper end the usual steering-handle C', Figs. 5 and 7. D is the front portion of the backbone, which ordinarily supports the saddle. A cross-head D' extends along the front end of the backbone D parallel to the steering-shaft C and hinged to the latter by bands or straps $D^2$, said straps turning loosely upon the shaft C.

As is well known, the machine is steered in part by the rider by changing the inclination of the wheel A with reference to the backbone D and the other wheel or wheels, and this change in inclination of the wheel A is made by turning the steering-shaft C in the joint formed in the straps $D^2$. It follows, then, that in the operation of the machine the backbone D and cross-head D' are relatively stationary, while the shaft C rotates with reference to such backbone and cross-head. Without such joint the machine is inoperative, particularly if the wheel is turned at an inclination to the backbone D and not allowed to be turned into the same plane with said backbone, as is done in my improvement.

When I lock the machine by my improved application of the lock, I destroy said joint during the time the machine remains locked.

E is the lock. This is located in the neck of the backbone D. E' is the bolt of the lock. This is arranged to be thrown forward and back, as is the bolt of an ordinary door-lock. When thrown forward, the bolt extends into the socket $E^2$, formed in the shaft C, out of the plane in which the wheel A stands, so that said bolt can only enter said socket when the wheel has been cramped.

I deem it unnecessary to show in detail the mechanism of the lock, because it is not essential that any particular form of lock be used. It is only necessary that it be suitable to throw the bolt E' forward and retract it. The lock may be embedded in the neck of the backbone D and the bolt E' extend through the cross-head D', or said lock may be applied flatwise against the outside of said neck. The lock may be made to require a key to operate it or it may embody combination mechanism. In Figs. 2 and 3 the bolt E' is shown resting in the socket $E^2$, the wheel being cramped. With the wheel locked in this position it is obviously impossible to operate the machine.

In lieu of the socket $E^2$ to engage the bolt E', a lug $E^3$ may be located upon the surface of the shaft C, so as to stand in the path of said bolt when the latter has been thrown forward. This is illustrated in Fig. 4. Said lug E³ presents a face which is radial to the cylindric shaft C, and such face is engaged by the bolt E' when the latter is thrown into the path of said face. In the form shown in Figs. 1 and 2 the vertical sides of the socket E² are also faces radial to the cylindric shaft C, and the bolt E' engages one of said faces by being extended into its path.

Referring now to Figs. 5, 6, and 7, A is again the wheel. B is the fork; B', the guard; C, the steering-shaft, and C' a steering-handle. D is again the backbone, but this is joined to the steering-shaft C by means of a sleeve D³, rigid with said backbone and loosely surrounding said steering-shaft. E is the lock, in this case applied to an outward extension of the sleeve D³, the bolt E' extending, when thrown forward, into a socket E² in the shaft C, as in Fig. 1. In Figs. 6 and 7 the section is taken at such lock, the machine being unlocked in Fig. 6 and cramped and locked in Fig. 7.

In Figs. 8 and 9 the form last above mentioned is modified by supporting the lock E upon the shaft C and arranging the bolt E' to extend into a socket E² in the upper edge of the sleeve D³. It will be seen that the walls of this socket are faces radial to the steering-shaft.

The cross-head D' (shown on the first sheet of drawings) and the sleeve D³ (shown on the second sheet of the drawings) are to be regarded as a part of the backbone D.

I claim as my invention—

1. In a velocipede, the combination, with the wheel A and the two members—namely, the backbone D and fork B—secured to said wheel and terminating above in a cylindric steering-shaft C, rigid with said fork, of a lock applied to one of said members and having a bolt adapted to be shifted into the path of a radial face supported by the other member, the relative positions of said bolt and radial face upon the members supporting them being such that they will meet only when the wheel A is cramped, substantially as described.

2. In a velocipede, the combination, with the wheel A and the two members—namely, the backbone D and fork B—secured to said wheel and terminating above in a cylindric steering-shaft C, of a lock applied to one of said members and having a bolt arranged to enter the socket in the other member, the relative positions of said bolt and socket upon the members which support them being such that said bolt may enter said socket only when the wheel is cramped, substantially as described.

3. In a velocipede, the combination, with the wheel A and the two members—namely, the backbone D and fork B—secured to said wheel and terminating above in a cylindric steering-shaft C, of a lock applied to said frame and having a bolt arranged to move into the path of a radial face upon said steering-shaft, the relative positions of said bolt and radial face upon said frame and steering-shaft being such that said bolt and radial face shall meet only when the wheel A is cramped, substantially as described.

4. In a velocipede, the combination, with the wheel A and the two members—namely, the backbone D and fork B—secured to said wheel and terminating above in a cylindric steering-shaft C, of a lock applied to said frame and having a bolt arranged to enter a socket in said steering-shaft, the relative positions of said bolt and socket upon said frame and steering-shaft being such that said bolt may enter said socket only when the wheel A is cramped, substantially as described.

In testimony whereof I affix my signature, in presence of two witnesses, this 16th day of December, in the year 1889.

CHARLES LYMAN FORTIER.

Witnesses:
WM. MCKIVITT,
F. O. HAMMER.